United States Patent
Kagerer et al.

(10) Patent No.: US 10,654,480 B2
(45) Date of Patent: May 19, 2020

(54) DRIVER ASSISTANCE SYSTEM IN A MOTOR VEHICLE

(71) Applicant: Bayerische Motoren Werke Aktiengesellschaft, Munich (DE)

(72) Inventors: Walter Kagerer, Munich (DE); Stefan Knoller, Munich (DE); Andreas Lechner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/132,810

(22) Filed: Sep. 17, 2018

(65) Prior Publication Data

US 2019/0016335 A1  Jan. 17, 2019

Related U.S. Application Data

(63) Continuation of application No. PCT/EP2017/055675, filed on Mar. 10, 2017.

(30) Foreign Application Priority Data

Mar. 18, 2016 (DE) .......... 10 2016 204 504

(51) Int. Cl.
*B60W 30/14* (2006.01)
*B60W 50/00* (2006.01)
(Continued)

(52) U.S. Cl.
CPC .......... *B60W 30/143* (2013.01); *B60W 10/04* (2013.01); *B60W 10/18* (2013.01);
(Continued)

(58) Field of Classification Search
CPC ......... B60W 30/143; B60W 30/18072; B60W 30/16; B60W 10/18; B60W 10/04;
(Continued)

(56) References Cited

U.S. PATENT DOCUMENTS

| 2011/0276216 | A1* | 11/2011 | Vaughan | ............... B60W 10/06 701/31.4 |
| 2012/0220422 | A1 | 8/2012 | Wurthner et al. | |
| 2017/0158204 | A1* | 6/2017 | Roos | ................. B60W 50/0097 |

FOREIGN PATENT DOCUMENTS

| DE | 197 07 140 C1 | 5/1998 |
| DE | 10 2004 017 115 A1 | 10/2005 |

(Continued)

OTHER PUBLICATIONS

International Search Report (PCT/ISA/210) issued in PCT Application No. PCT/EP2017/055675 dated Jul. 4, 2017 with English translation (six (6)pages).

(Continued)

*Primary Examiner* — Thomas Ingram
(74) *Attorney, Agent, or Firm* — Crowell & Moring LLP

(57) ABSTRACT

A driver assistance system in a motor vehicle, by which system, when the cruise control is activated, a predefined target speed is maintained essentially constantly via an electronic control device and sensors connected thereto. Depending on a control error with respect to the predefined speed, a drive system and/or a brake system is actuated with the aim of compensating the control error. The electronic control device is configured such that when a coasting mode is present with the cruise control actuated the current speed is detected by way of the sensors and the coasting mode is maintained despite a target-speed-dependent maximum permissible speed having been reached.

7 Claims, 2 Drawing Sheets

(51) Int. Cl.
  *B60W 10/04* (2006.01)
  *B60W 10/18* (2012.01)
  *B60W 30/16* (2020.01)
  *B60W 30/18* (2012.01)

(52) U.S. Cl.
  CPC ...... *B60W 30/16* (2013.01); *B60W 30/18072* (2013.01); *B60W 50/0097* (2013.01); *B60W 2030/1809* (2013.01); *B60W 2030/18081* (2013.01); *B60W 2520/10* (2013.01); *B60W 2550/142* (2013.01); *B60W 2720/103* (2013.01); *Y02T 10/52* (2013.01); *Y02T 10/76* (2013.01)

(58) Field of Classification Search
  CPC ....... B60W 50/0097; B60W 2720/103; B60W 2520/10; B60W 2030/1809; B60W 2030/18081; B60W 2550/142; Y02T 10/76; Y02T 10/52
  See application file for complete search history.

(56) References Cited

FOREIGN PATENT DOCUMENTS

| | | |
|---|---|---|
| DE | 10 2007 006 501 A1 | 8/2008 |
| DE | 10 2007 053 514 A1 | 5/2009 |
| DE | 10 2009 046 341 A1 | 5/2011 |
| DE | 10 2010 031 382 A1 | 1/2012 |
| EP | 1 661 750 A1 | 5/2006 |
| GB | 2516497 A | 1/2015 |
| WO | WO 2012/169961 A1 | 12/2012 |
| WO | WO 2016/007071 A | 1/2016 |

OTHER PUBLICATIONS

German-language Written Opinion (PCT/ISA/237) issued in PCT Application No. PCT/EP2017/055675 dated Jul. 4, 2017 (seven (7) pages).

German Search Report issued in counterpart German Application No. 10 2016 204 504.0 dated Jan. 17, 2017 with partial English translation (11 pages).

* cited by examiner

DRIVER ASSISTANCE SYSTEM IN A MOTOR VEHICLE

CROSS REFERENCE TO RELATED APPLICATIONS

This application is a continuation of PCT International Application No. PCT/EP2017/055675, filed Mar. 10, 2017, which claims priority under 35 U.S.C. § 119 from German Patent Application No. 10 2016 204 504.0, filed Mar. 18, 2016, the entire disclosures of which are herein expressly incorporated by reference.

BACKGROUND AND SUMMARY OF THE INVENTION

The invention relates to a driver assistance system in a motor vehicle and to a correspondingly configured method.

In motor vehicles with driver assistance systems by means of which, in particular, a predefined speed or a predefined distance from the vehicle traveling ahead is to be constantly maintained, methods are already known by means of which a drive system and/or a wheel brake system are actuated in order to reach specific driver assistance goals.

DE 10 2007 006 501 A1 and DE 10 2004 017 115 A1 have already disclosed fuel-saving operating modes for cruise control systems by means of which generally a relatively large control error from the target vehicle speed is permitted. In this context, what is referred to as a coasting mode can also be activated in which an interruption in the transmission of power is brought about, in particular by opening a clutch at or in the transmission. During a coasting mode, the drive engine can also be switched off in order to reduce the consumption of fuel. The coasting mode is ended when the lower permitted threshold of the control error is reached.

DE 10 2010 031 382 A1 discloses a driver assistance system in a motor vehicle by means of which, when the cruise control is activated, a predefined speed or a predefined distance from the vehicle traveling ahead is maintained essentially constantly, and wherein an operating strategy which is optimum in terms of energy, with maximum possible integration of the coasting mode and overrun mode is carried out in order to attain minimum fuel consumption as a function of map-based data of a navigation system. The coasting mode is also switched off when the cruise control is deactivated if the distance from a vehicle traveling ahead is too short or if activation of the brake pedal is to be expected.

Vehicles with cruise control systems which switch into the coasting mode when predetermined conditions apply are commercially available. The coasting mode is exited when the vehicle accelerates, at the latest when a maximum permissible speed is reached.

DE 197 07 140 C1 also discloses a method and a device which increments or decrements a counter reading on the basis of the acceleration behavior of the vehicle and determination of whether a braking device is activated, and starts or ends a coasting mode as a function of the counter reading.

An object of the invention is to improve further a driver assistance system of the type mentioned at the beginning and a corresponding method for controlling a driver assistance system which is designed to perform cruise control, with respect to reducing the fuel consumption and improving the convenience.

The invention is based on a basically known cruise control system with a coasting mode which is permitted and can be actuated in a targeted fashion. When the cruise control is active and the coasting mode is active, the speed is intended to deviate only slightly from the target speed despite the coasting mode. Since the vehicle can accelerate owing to external influences (e.g. traveling downhill) in the coasting mode during which no power is transmitted, the permitted tolerance band around the target speed is, under certain circumstances, departed from in the upward direction, which in the prior art causes the coasting mode to be ended and brings about a simultaneous change into the overrun mode and, under certain circumstances, even into the braking mode. This in turn leads to a situation in which the initiated coasting phases can be very short, which can be perceived by the driver as inefficient and uncomfortable.

The invention is based on the idea of maintaining the coasting mode which has been activated during cruise control for as long as possible, in order thereby to give the driver a driving sensation which is efficient in terms of energy and comfortable.

With the inventive driver assistance system in a motor vehicle, which, when the cruise control is activated, maintains a predefined target speed or a predefined distance from the vehicle traveling ahead essentially constantly by means of an electronic control device and sensors connected thereto, the control device is configured according to the invention, in particular, by corresponding programming and by necessary interfaces to other control devices, in such a way that when a coasting mode is present with the cruise control activated the current speed is acquired by means of sensors, and despite a target-speed-dependent, maximum permissible speed (e.g. upper limit of a permitted tolerance band) for the cruise control being reached the coasting mode is maintained.

The target-speed-dependent maximum permissible speed can deviate from the target speed by a permanently or variably predefined value or can be identical to the target speed.

So that, despite the coasting mode being maintained or retained when the maximum permissible speed is reached, this threshold is not exceeded, the control device is advantageously configured to bring about an automatic braking intervention while maintaining the coasting mode when a coasting mode is present with the cruise control activated and the maximum permissible speed is reached or exceeded, i.e. the control device brings about an automatic braking intervention with the coasting mode (still) active, which is, in particular, configured or brought about in such a way that the maximum permissible speed (or a speed threshold which is set below the maximum permissible speed) is reached again and/or not exceeded.

Basically, the coasting mode can be exited e.g. when the brake pedal is activated. Likewise, the coasting mode can be exited with the cruise control active and the brake pedal not activated (and if appropriate when the maximum permissible speed is reached), for energetic reasons or for reasons relating to comfort, if it is no longer appropriate to reach or maintain the maximum permissible speed while maintaining the coasting mode. In particular, when a coasting mode is present with the cruise control activated it is therefore possible to exit the coasting mode when a braking torque which is required, or which would be requested, to reach or maintain the maximum permissible speed exceeds a predefined absolute braking torque threshold.

In analogous fashion to this, when a coasting mode is present with the cruise control activated (with the brake pedal not activated) the coasting mode can also be exited when a deceleration of the vehicle which is required, or which would be requested, to reach or maintain the maximum permissible speed exceeds a predefined deceleration threshold.

A corresponding method for controlling the driver assistance system can be embodied in an analogous fashion to the inventive driver assistance system proposed here, in that, when a coasting mode is present with the cruise control activated the current speed is acquired by means of the sensors, and despite a target-speed-dependent, maximum permissible speed being reached the coasting mode is maintained.

Further advantageous refinements of the driver assistance system according to the invention also apply to the method according to the invention which can be implemented in a suitable control device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
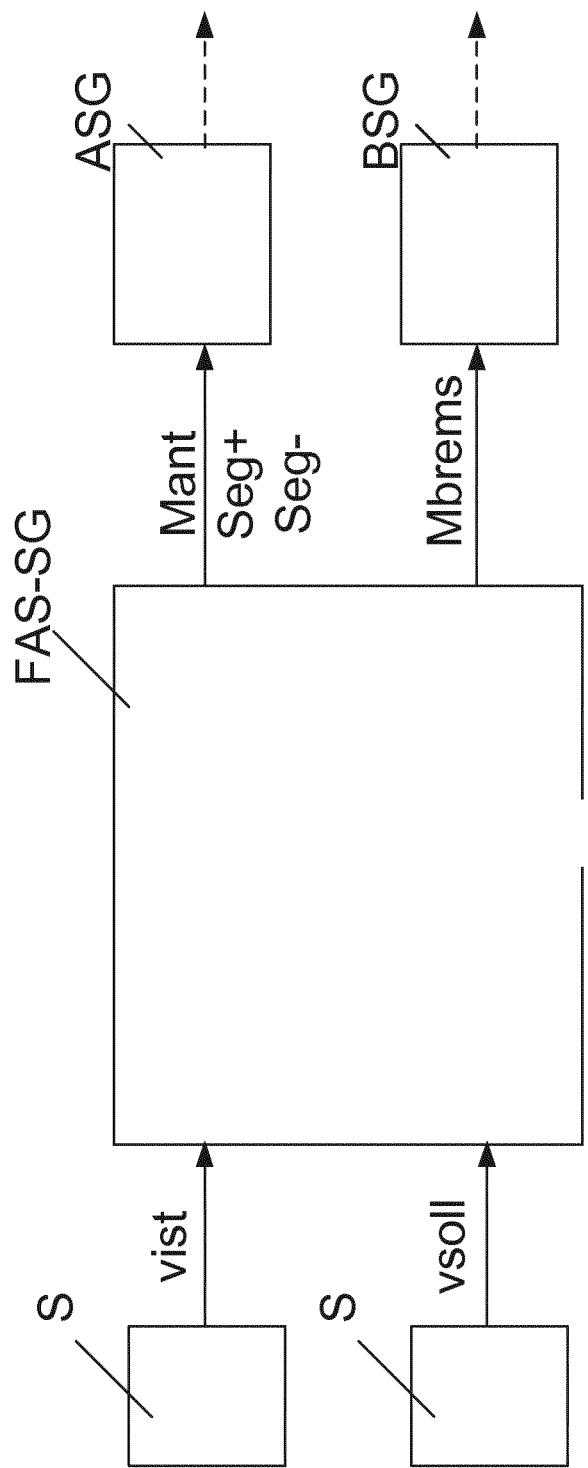
FIG. 1 shows an example of a driver assistance system according to the invention for performing cruise control.

FIG. 1 shows in detail a control device FAS-SG which is decisive for the driver assistance system and which is connected to a sensor unit S for transmitting the current speed vist, to an operator control unit BE, by means of which the driver can predefine his desired target speed vsoll, to an engine control device ASG and to a brake control device BSG. When a cruise control is active, the driver assistance system control device FAS-SG determines, in particular taking into account the current speed vist and the predefined target speed vsoll, request signals for the drive actuator system (not illustrated here) and the brake actuator system (not illustrated here), which signals are transmitted to the respective control devices ASG and BSG. The latter determine corresponding actuation signals therefrom for the respective actuator system.

The driver assistance system is basically designed in such a way that switching into a coasting mode of the drive actuator system without transmission of power can also be performed during the cruise control if said switching is permitted and appears appropriate. On the basis of the coasting capability with active cruise control the driver assistance system control device FAS-SG can send the following request signals:
- a coasting activation request seg+, a coasting deactivation request (=overrun activation request) seg− and a drive torque request Mant to the control device of the drive actuator system ASG.
- a deceleration request or a braking torque request Mbrems to the control device of the brake actuator system BSG.

Figure 2:
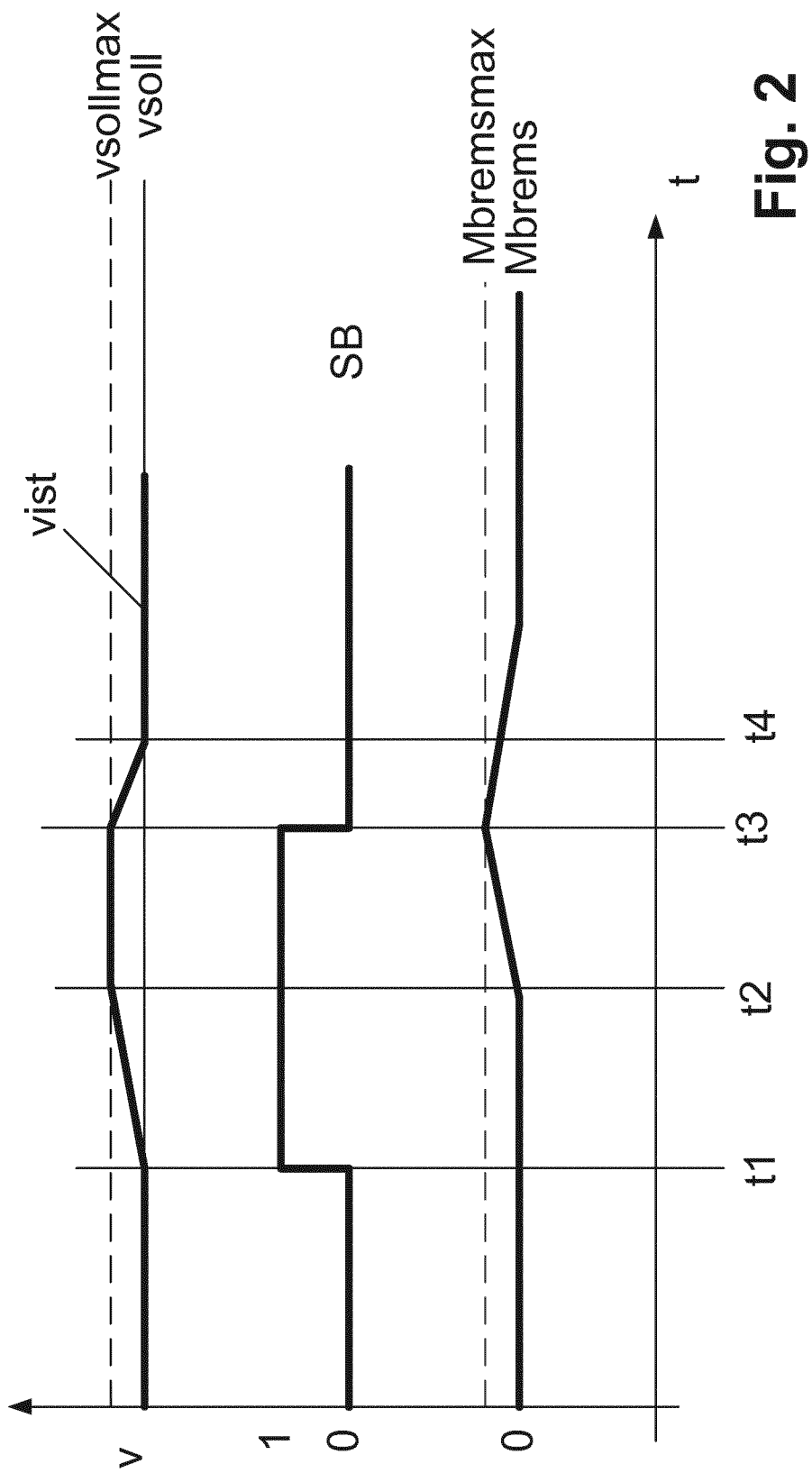
FIG. 2 shows a time profile of various parameters while a cruise control is active.

A procedure which is relevant with respect to the invention for optimum actuation of the actuator system is explained in more detail using FIG. 2. Here, FIG. 2 shows a plurality of relevant parameter profiles or signal profiles plotted over the time t:
- A predefined target speed vsoll in conjunction with a maximum permissible speed vsollmax, which is allowed as a function of the target speed vsoll, with active cruise control.
- The current speed profile vist of the vehicle.
- A coasting mode status signal SB, wherein in the case of the value 0 no coasting mode is active, and in the case of the value 1 the coasting mode is active during the cruise control.
- A braking torque profile Mbrems in conjunction with a maximum permissible braking torque threshold Mbremsmax during the coasting mode with the cruise control active.

During the entire time period t, the cruise control is active and the current speed vist is adjusted essentially to the target speed vsoll. At the time t1, switching into the coasting mode occurs. Owing to the current condition of the road (negative gradient) the vehicle accelerates slightly, until the upper maximum permissible speed vsollmax is reached at the time t2. As soon as this limiting speed vsollmax, which must not be exceeded, is reached, low braking torque Mbrems is requested while the coasting mode is maintained, in order to avoid exceeding the maximum permissible speed vsollmax, i.e. gentle braking is requested with the adjustment goal of the maximum permissible speed vsollmax. The coasting is therefore not ended and the impression for the driver that the vehicle continues to coast is maintained.

If the requested braking torque Mbrems, considered in absolute terms, reaches the predefined maximum permissible braking torque threshold Mbremsmax for the coasting mode (time t3), the coasting mode is ended since excessively hard braking would be inefficient. As a result of the ending of the coasting mode and the associated "activation" of the overrun mode, adjustment to the maximum permissible speed vsollmax is performed in conjunction with the requested braking torque Mbrems (time t4). If the negative gradient becomes flatter again later (time t5), the braking is reduced and the speed is decreased again to the target speed by means of the overrun mode (time t6).

If the negative gradient were to become flatter again with the coasting mode active before the maximum permissible braking torque threshold Mbremsmax is reached, and the vehicle were therefore to slow down again, the requested braking torque Mbrems would be reduced again and the coasting mode would also be maintained.

The invention illustrated here therefore permits gentle automatic braking during the coasting mode without changing to the trailing throttle mode in the drive. It is therefore possible to bring about a relatively long coasting phase and nevertheless not exit the allowed speed tolerance band around the target speed. For efficiency reasons, only gentle braking is to be permitted, since in the case of relatively hard braking a trailing throttle mode would be more appropriate. Since gentle braking cannot generally be perceived by the driver, this therefore causes him to experience a relatively long lasting coasting phase.

The reproducibility of the coasting phase with the cruise control active also increases since it is possible to travel along more sections of a route with a negative gradient using a so-called coasting cruise controller. The display of the coasting phase also becomes more constant by virtue of this measure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driver assistance system in a motor vehicle, comprising:
an electronic control device and connected sensors, which, when cruise control is activated, maintains a predefined target speed essentially constantly, wherein
depending on a control error with respect to the predefined target speed, a drive system and/or a brake system is actuated so as to compensate the control error, and
the control device is operatively configured such that when a coasting mode is present with the cruise control activated, a current speed is acquired by way of the sensors, and the coasting mode is maintained despite a target speed dependent maximum permissible speed having been reached.

2. The driver assistance system as claimed in claim 1, wherein
the control device is further operatively configured such that, when the coasting mode is present with the cruise control activated and when the maximum permissible speed is reached while maintaining the coasting mode, an automatic braking intervention is brought about.

3. The driver assistance system as claimed in claim 2, wherein
the automatic braking intervention is brought about such that the maximum permissible speed is not exceeded.

4. The driver assistance system as claimed in claim 1, wherein
when the coasting mode is present with the cruise control activated, the coasting mode is ended when, for energy reasons, it is no longer appropriate to reach or maintain the maximum permissible speed while maintaining the coasting mode.

5. The driver assistance system as claimed in claim 1, wherein
when the coasting mode is present with the cruise control activated, the coasting mode is ended when a braking torque which is required to reach or maintain the maximum permissible speed exceeds a predefined absolute braking torque threshold.

6. The driver assistance system as claimed in claim 1, wherein
when the coasting mode is present with the cruise control activated, the coasting mode is ended when a deceleration of the vehicle which is required to reach or maintain the maximum permissible speed exceeds a predefined deceleration threshold.

7. A method for controlling a driver assistance system in a motor vehicle, by which, when cruise control is activated, a predefined target speed is maintained essentially constantly via an electronic control device and sensors connected thereto, wherein a drive system and/or a brake system is actuated as a function of a control error with respect to the predefined speed, with the aim of compensating the control error, the method comprising the steps of:
when a coasting mode is present with the cruise control activated, acquiring the current speed via the sensors; and
maintaining the coasting mode despite a target speed dependent maximum permissible speed having been reached.

* * * * *